US008327330B1

(12) United States Patent
Yang et al.

(10) Patent No.: US 8,327,330 B1
(45) Date of Patent: Dec. 4, 2012

(54) SYSTEM AND METHOD OF GENERATING BUILD INSTRUCTIONS

(75) Inventors: Don Hsi-Yun Yang, Milpitas, CA (US); Paul Anthony Marks, Mountain View, CA (US)

(73) Assignee: Google Inc., Mountain View, CA (US)

( * ) Notice: Subject to any disclaimer, the term of this patent is extended or adjusted under 35 U.S.C. 154(b) by 499 days.

(21) Appl. No.: 12/685,125

(22) Filed: Jan. 11, 2010

(51) Int. Cl.
G06F 9/44 (2006.01)
(52) U.S. Cl. .................. 717/120; 717/121; 717/172
(58) Field of Classification Search .................. None
See application file for complete search history.

(56) References Cited

U.S. PATENT DOCUMENTS

| | | | |
|---|---|---|---|
| 7,437,712 B1 * | 10/2008 | Brown et al. ............... | 717/121 |
| 7,448,030 B2 * | 11/2008 | Liu et al. .................... | 717/157 |
| 7,458,073 B1 * | 11/2008 | Darling et al. .............. | 717/172 |
| 7,721,272 B2 * | 5/2010 | Mockford ................... | 717/120 |
| 7,797,689 B2 * | 9/2010 | Mockford ................... | 717/120 |
| 2004/0237070 A1 * | 11/2004 | Roth et al. .................. | 717/121 |
| 2005/0028151 A1 * | 2/2005 | Roth et al. .................. | 717/162 |
| 2005/0114847 A1 * | 5/2005 | Whalley ..................... | 717/140 |
| 2007/0136718 A1 * | 6/2007 | Mockford ................... | 717/127 |
| 2007/0168974 A1 * | 7/2007 | Mockford ................... | 717/101 |
| 2007/0240154 A1 * | 10/2007 | Gerzymisch et al. ....... | 717/174 |
| 2008/0209413 A1 * | 8/2008 | Kakumani et al. .......... | 717/172 |

OTHER PUBLICATIONS

Dockter et al., "Gradle User Guide—A better way to build", 2010, Hans Dockter, Adam Murdoch, pp. 1-343; <http://www.gradle.org/docs/current/userguide/userguide.pdf>.*

Benjajmin S. Skrainka, "Using Make for Software Build Management", May 23, 2012, University of Chicago; <http://home.uchicago.edu/~skrainka/pdfs/Talk.Make.pdf>.*

Eichberg et al., "Defining and Continuous Checking of Structural Program Dependencies", 2008 ACM, pp. 391-400; <http://ieeexplore.ieee.org/stamp/stamp.jsp?tp=&arnumber=4814150>.*

Yu et al., "Removing False Code Dependencies to Speedup Software Build Processes", 2003, IBM Press, pp. 343-353; <http://dl.acm.org/citation.cfm?id=961375>.*

Bill Hoffman, "[CMake] CMake 2.6.4 available for download", May 1, 2009, <http://www.cmake.org/pipermail/cmake/2009-May/029169.html>, downloaded from the Internet on Oct. 22, 2009, 1 page.

"ccache", samba.org, <http://ccache.samba.org>, downloaded from the Internet on Oct. 14, 2009, 3 pages.

"distcc: a fast, free distributed c/c++ compiler", Copyright 2009 Google, <http://code.google.com/p/distcc/>, downloaded from the Internet on Oct. 14, 2009, 2 pages.

"GNU Make", May 26, 2006, Copyright 2006 Free Software Foundation, Inc. <http://www.gnu.org/software/make/>, downloaded from Internet on Oct. 22, 2009, 3 pages.

* cited by examiner

*Primary Examiner* — Thuy Dao
*Assistant Examiner* — Ben C Wang
(74) *Attorney, Agent, or Firm* — Lerner, David, Littenberg, Krumholz & Mentlik, LLP (57) ABSTRACT

Systems and methods provide build instructions for generating output information from input information. Output information or files may be associated with a plurality of dependent input files. Build tools may be retrieved for operation on input files to generate a particular output file. A set of instructions is determined by evaluating dependencies which identify files and tools used to generate the output file. The instructions are ordered so as to reduce the number of times a build tool is retrieved and so that output files are used efficiently.

19 Claims, 7 Drawing Sheets

SYSTEM AND METHOD OF GENERATING BUILD INSTRUCTIONS

BACKGROUND OF THE INVENTION

In certain systems output files are generated by applying tools to source code. For example, systems may compile and assemble source code files in a single step such that compiler output files are immediately assembled by an assembler. These systems generate target files based on build instructions which retrieve tools successively for each source code file. Further, these systems require calling compilers, assemblers, and other build tools which are generally several times larger than the source files upon which they operate. Accordingly, calling these tools may require significant processing power, and the order in which these tools are called from cache may affect the efficiency of the system.

BRIEF SUMMARY OF THE INVENTION

One aspect of the invention provides a method. The method includes accessing a plurality of tools; accessing a plurality of dependencies, wherein each dependency of the plurality of dependencies is associated with at least one input file, a tool of the plurality of tools, and a target file, wherein the tool of the plurality of tools requires the at least one input file to output the target file; identifying a first target file and a first dependency of the plurality of dependencies associated with the first target file; determining a first tool based on the first dependency; determining other dependencies of the plurality of dependencies associated with the first target file; generating an ordered list of the first dependency and the other dependencies, wherein any of the dependencies associated the first tool are listed before other ones of the dependencies that identify a different tool than the first tool; identifying at least one input file input file associated with the first dependency and at least one input file associated with the other dependencies; and generating instructions identifying an order in which the first tool and the different tool will be executed by a processor and the at least one input file associated with the first dependency and the at least one input file associated with the other dependencies, the order of instructions being based on the ordered list of the first dependency and the other dependencies.

In one example, a more recently added dependency is listed in the ordered list before other ones of the dependencies.

In another example, the generated instructions identify the first tool as a final tool to be executed by the processor.

In a further example, determining other dependencies associated with the first target file includes identifying a second input associated with the first dependency; selecting the second input file associated with the first dependency if the second input file is more recently added than the input file associated with the first dependency; selecting a second target file based on the selected second input file; and determining a second dependency associated with a second tool and the selected second target file. The second tool may be different from the first tool. The method may further include generating the first target file and the second target file based on the generated instructions.

In yet another example, the method includes generating the first target file by causing a processor to operate tools on the first dependency and the at least one input file associated with the other dependencies in the order identified in the generated instructions.

In an additional example, the first target file is executable machine code.

In another aspect of the invention, a system is provided. The system includes a processor; instructions operable by the processor; and a display displaying data processed by the processor in accordance with the instructions. The instructions cause the processor to access a plurality of tools; access a plurality of dependencies, wherein each dependency of the plurality of dependencies is associated with at least one input file, a tool of the plurality of tools, and a target file, wherein the tool of the plurality of tools requires the at least one input file to output the target file; identify a first target file and a first dependency of the plurality of dependencies associated with the first target file; determine a first tool based on the first dependency; determine other dependencies of the plurality of dependencies associated with the first target file; generate an ordered list of the first dependency and the other dependencies, wherein any of the dependencies associated the first tool are listed before other ones of the dependencies that identify a different tool than the first tool; identify at least one input file input file associated with the first dependency and at least one input file associated with the other dependencies; and generate instructions identifying an order in which the first tool and the different tool will be executed by a processor and the at least one input file associated with the first dependency and the at least one input file associated with the other dependencies, the order of instructions being based on the ordered list of the first dependency and the other dependencies.

In one example, a more recently added dependency is listed in the ordered list before other ones of the dependencies.

In another example, the generated instructions identify the first tool as a final tool to be executed by the processor.

In a further example, the determining other dependencies associated with the first target file instruction further causes the processor to identify a plurality of input files associated with the first dependency in a particular order which indicates a most recently added input file; select a second target file based on the most recently added input file; and determine a second dependency associated with a second tool and the selected second target file. The second tool may be different from the first tool. The instructions may further cause the processor to generate the first target file and the second target file based on the generated instructions.

In yet another example, the instructions further cause the processor to generate the first target file by operating tools on input files to the set of tools in the order identified in the generated instructions.

In an additional example, the first target file is executable machine code.

In an additional aspect of the invention, a method is provided. The method includes accessing a plurality of tool sets; accessing a plurality of dependencies, wherein each dependency of the plurality of dependencies is associated with at least one input file, a tool of the plurality of tools, and a target file, wherein the tool of the plurality of tools requires the at least one input file to output the target file; identifying a first target file and a first dependency of the plurality of dependencies associated with the first target file; determining a first tool set based on the first dependency; determining other dependencies of the plurality of dependencies associated with the first target file; generating an ordered list of the first dependency and the other dependencies, wherein any of the dependencies associated the first tool set are listed before other ones of the dependencies that identify a different tool set than the first tool set; identifying at least one input file input file associated with the first dependency and at least one input file associated with the other dependencies; and generating instructions identifying an order in which the first tool set and the different tool set will be executed by a processor and the at least one input file associated with the first dependency and the at least one input file associated with the other dependencies, the order of instructions being based on the ordered list of the first dependency and the other dependencies.

In one example, a more recently added dependency is listed in the ordered list before other dependencies.

In another example, the method includes generating the target file by executing a processor to operate the first tool set on the at least one input file associated with the first dependency and the different tool set on the at least one input file associated with the other dependencies in the order identified in the generated instructions.

DETAILED DESCRIPTION

In accordance with aspects of the invention, systems and methods provide build instructions for generating output information from input information. Output information or files may be associated with a plurality of dependent input files. Build tools may be retrieved for operation on input files to generate a particular output file. A set of instructions is generated by determining dependencies which identify files and tools used to generate the output file. The instructions are ordered so as to reduce the number of times a build tool is retrieved and so that output files are used efficiently.

Figure 1:
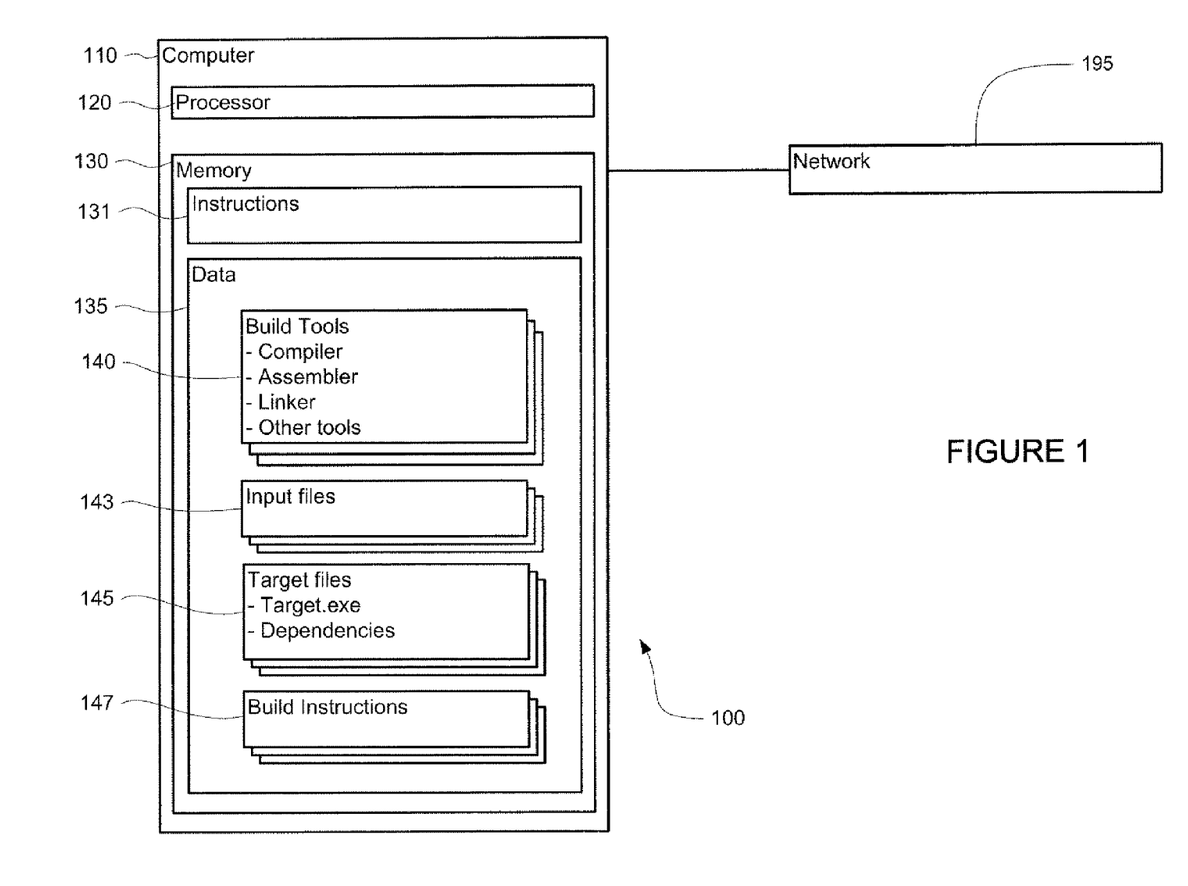
FIG. 1 is a functional diagram of a system in accordance with an aspect of the invention.

As shown in FIG. 1, a system 100 in accordance with one aspect of the invention includes a computer 110 containing a processor 120, memory 130 and other components typically present in general purpose computers.

Memory 130 stores information accessible by processor 120, including instructions 131 that may be executed by the processor 120 and data 135. The memory may be of any type capable of storing information accessible by the processor, including a computer-readable medium, or other medium that stores data that may be read with the aid of an electronic device, such as a hard-drive, memory card, read only memory ("ROM"), random access memory ("RAM"), digital video disc ("DVD") or other optical disks, as well as other write-capable and read-only memories. Implementations may include different combinations of the foregoing, whereby different portions of the instructions and data are stored on different types of media.

The instructions 131 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 135 may be retrieved, stored or modified by processor 120 in accordance with the instructions 131. For instance, although the system and method is not limited by any particular data structure, the data may be stored in computer registers, in a relational database as a table having a plurality of different fields and records, Extensible Markup Language ("XML") documents or flat files. The data may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., bitmap image file ("BMP")) or lossy (e.g., the Joint Photographic Experts Group standard format ("JPEG")), and bitmap or vector-based (e.g., scalable vector graphics ("SVG")), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any well-known processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. Accordingly, references to a processor or computer will be understood to include references to a collection of processors or computers or memories that may or may not operate in parallel.

The computer 110 may be at one node of a network 195 and capable of directly and indirectly communicating with other nodes of the network.

Data 135 may include various build tools 140. Build tools may operate on various types of code, for example input files 143 to generate target files 145. For example, build tools 140 may include compilers, assemblers, linkers or other tools for building files. These tools may be retrieved and loaded into cache memory, for example RAM or other types of memory, for operation by a processor on various input files. As explained above, generally build tools are several times larger than the code files upon which the tools operate. Input files for use with build tools may include source code files, assembly code files, compiler code files, or other types of computer code files. For example, a compiler tool may operate on source code to generate assembly code, which in turn may be operated on by an assembler tool to generate assembly code. The assembly code may be linked by a linker tool to generate machine code.

The output machine code may define a target file. For example, a target may be an executable file built by the system in accordance with build instructions.

Target files may also be associated with dependencies. As will be described in more detail below, a particular target, for example, Target.exe, may be dependent on various source code, assembly code, or other computer code. The dependencies may be used to define a set of build instructions to generate a particular target from various types of code.

Build instructions 147 of data 135 may define the associations between dependent code files, build tools, and target files. For example, a set of build instructions may include the identity of an input source code file and an ordered set of tools used to generate the target file from the inputted source code.

In addition to the operations described below and illustrated in the figures, various operations in accordance with a variety of aspects of the invention will now be described. It should be understood that the following operations do not have to be performed in the precise order described below. Rather, various steps can be handled in reverse order or simultaneously.

It will be further understood that the sample values, types and configurations of data shown in the figures are for the purposes of illustration only. In that regard, systems and methods in accordance with the present invention may include different data values, types and configurations, and may be provided and received at different times (e.g., via different web pages) and by different entities (e.g., some values may be pre-suggested or provided from different sources).

In one embodiment a target file is selected to be built. As shown in the example of block 210 of FIG. 2, a processor may select a target output file such as Target.exe. Target, "T" in the example of block 214, may be set to Target.exe. Initially as shown in blocks 214 and 216, build tool "C" and build instructions "S" may remain empty sets, undefined, or some default.

Figure 2:
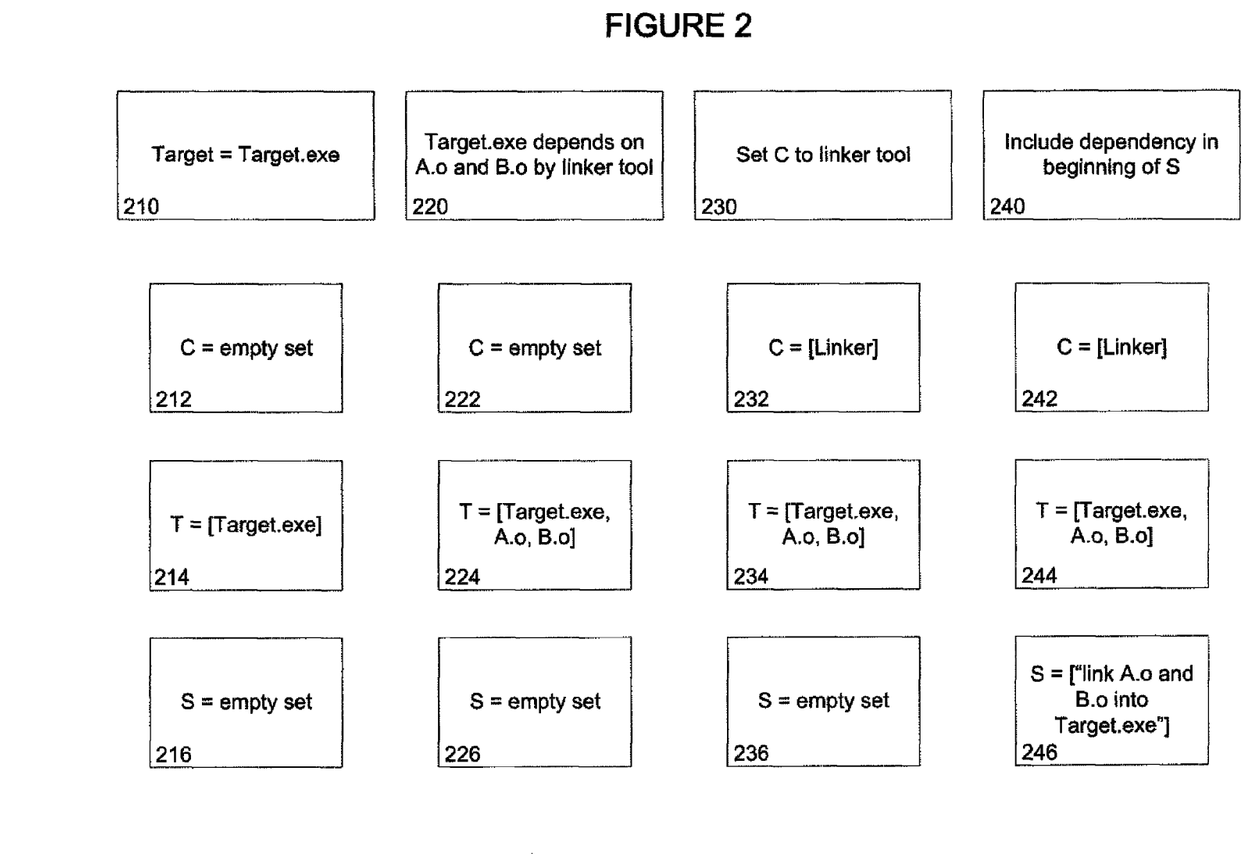
FIG. 2 is a pictorial diagram of a system in accordance with an aspect of the system and method.

The direct dependencies of the target may then be determined. For example, as shown in block 220, Target.exe may depend directly from assembler code files A.o and B.o by a linker tool. In other words, A.o and B.o may be linked to generate Target.exe. As shown in block 224, Target "T" may be updated or rewritten to include Target.exe, A.o and B.o. As shown in blocks 222 and 226, "c" and "S" may remain undefined.

A build tool is selected based on the dependencies of the target file. For example, A.o and B.o, the identified dependencies of Target.exe, may be associated with Target.exe by a linker tool. As shown in blocks 230 and 232, build tool "C" may be set to a linker tool. By selecting build tools based on the association between the direct dependencies between the input files and output files, performance may be optimized by decreasing the number of times a particular build tool is loaded into cache memory during a build. As shown in blocks 234 and 236, "T" and "S" may remain unchanged.

The association between the target file and the dependencies may be included in build instructions "S." For example, as A.o and B.o may be operated on by a linker tool to generate Target.exe, the instruction "link A.o to B.o into Target.exe" may be added to the beginning of build instructions "S" as shown in blocks 240 and 246. As shown in blocks 242 and 244, "C" and "T" may remain unchanged.

Figure 3:
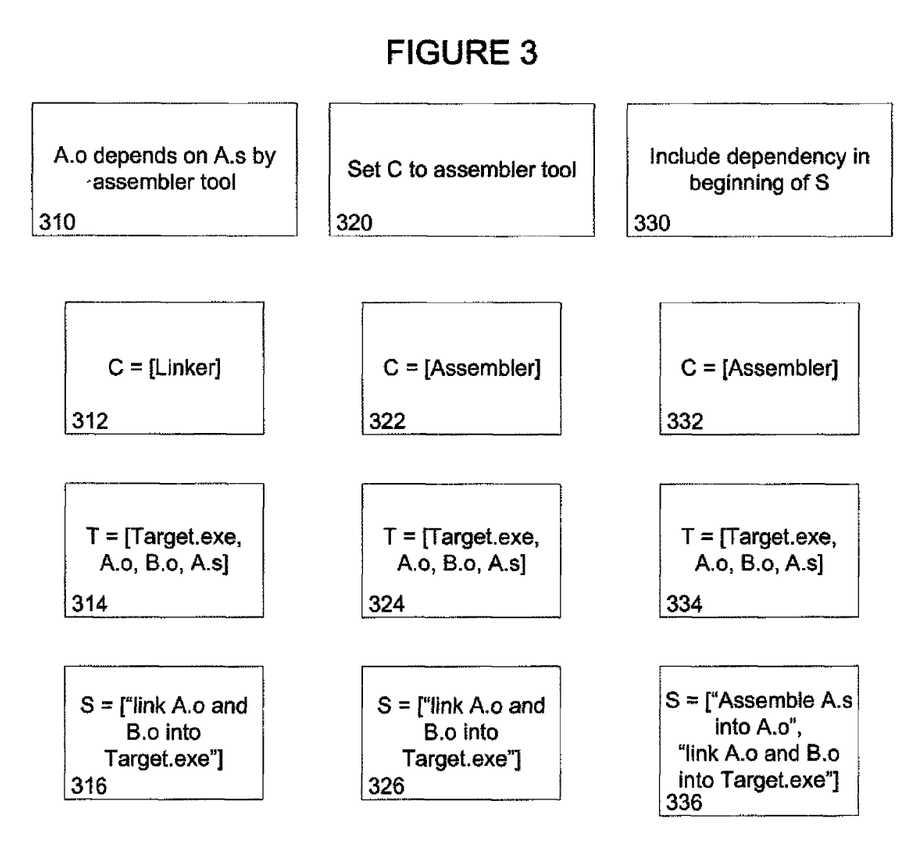
FIG. 3 is a functional diagram of data in accordance with an aspect of the invention.

Additional build instructions may be generated based on the further dependencies of the target file. These dependencies of the dependencies of the target file may be considered the secondary or indirect dependencies of the target file. For example, while A.o and B.o may be the only direct dependencies of Target.exe, A.o and B.o may each have dependencies. As shown in block 310, A.o may depend on the assembly code file A.s by an assembler tool. Similarly, B.o may depend on the assembly code file B.s by an assembler tool. Both A.o and B.o may be added to target "T" as shown in block 314. These further dependencies may be used to generate additional build instructions. As shown in blocks 312 and 316, "C" and "S" may remain unchanged.

A next tool may be selected based on the dependencies not previously incorporated into the build instructions. For example, A.o may depend on A.s by the assembler tool, and as shown in blocks 320 and 322, build tool "C" may be set to assembler. Then, as in blocks 330 and 336, the instruction "Assemble A.s into A.o" may be included at the beginning of build instructions "A."

Figure 4:
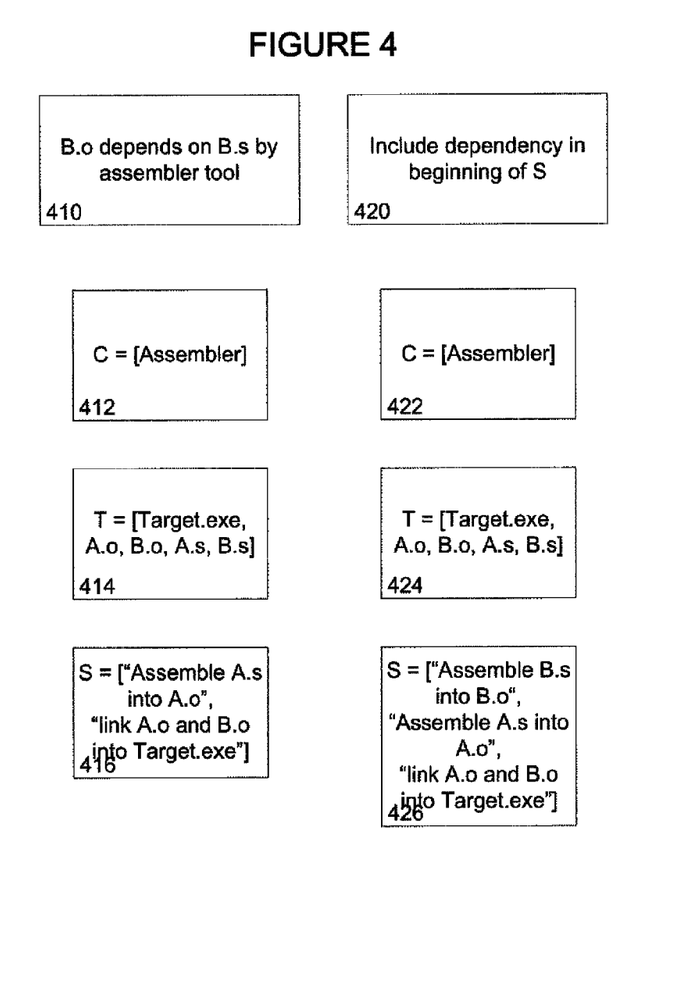
FIG. 4 is a functional diagram of data in accordance with an aspect of the invention.

Such a process may continue to generate instructions based on the remaining secondary dependencies. As shown in block 416 of FIG. 4, an instruction for B.o had not been included in the build instructions of FIG. 3. As shown in block 410, B.o depends on B.s by the assembler tool. As explained above and shown in blocks 420 and 426, B.s may be added to target "T," and the instruction "Assemble B.s into B.o" may be added to the beginning of build instructions "S."

Figure 5:
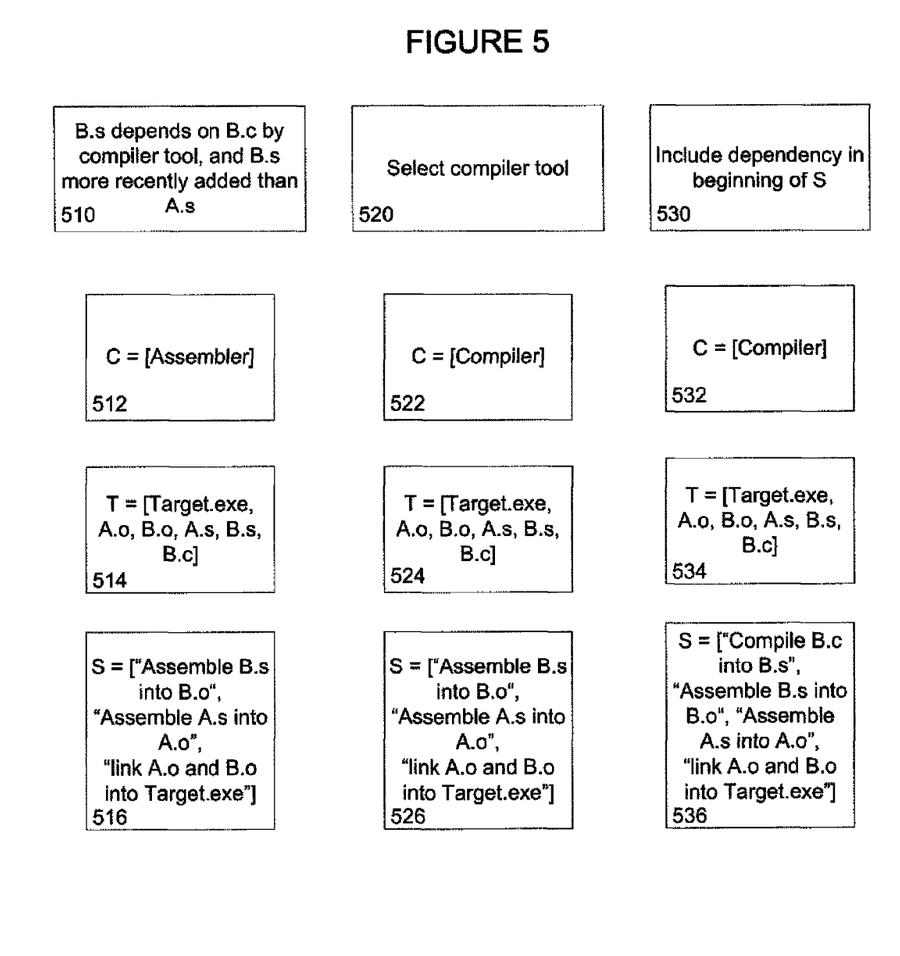
FIG. 5 is a functional diagram of data in accordance with an aspect of the invention.

When the dependencies associated with a particular tool have been exhausted, a next dependency may be selected based on which dependency was more recently added. Selection in this manner allows the processor to generate build instructions which provide for continued operation on a particular file by multiple build tools. In the example, both A.s and B.s are dependencies of A.o and B.o, respectively. In the example, B.s was more recently added to target "T" than B.s. As shown in blocks 510, 520, and 530 of FIG. 5, B.s is selected over A.s, build tool "C" is set to the compiler tool, and the build instruction "Compile B.c into B.s" is added to build instructions "S."

As explained above, the process may continue to generate instructions based on the remaining dependencies. As shown in block 610 of FIG. 6, A.s may depend on A.c by the compiler tool. As shown in block 614, A.c may be added to target "T," and then in blocks 620 and 626, the instruction "Compile A.c into A.s" may be added to the beginning of build instructions "S."

Figure 6:
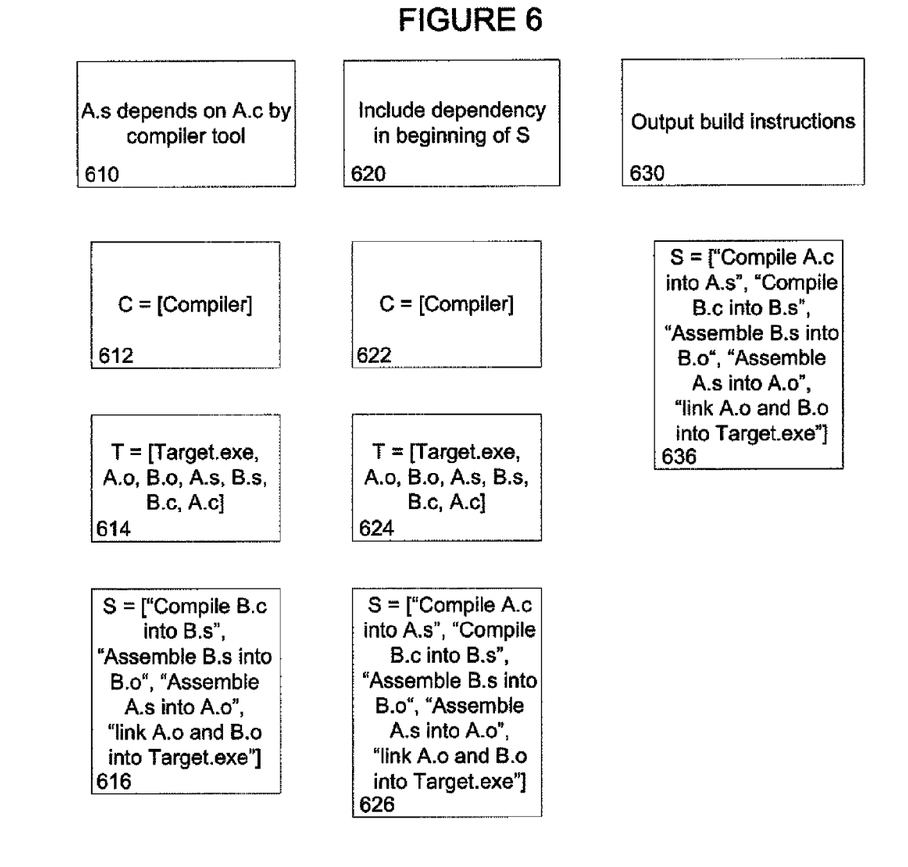
FIG. 6 is a functional diagram of data in accordance with an aspect of the invention.

When all of the dependencies, direct and indirect, of the target file have been exhausted, build instructions are output. For example, A.s and B.s depend on source code files A.c and B.c, respectively, by a compiler tool. However, A.c and B.c have no direct dependencies. Accordingly, in the example, there are no further dependencies of the target file and build instruction set "S" is complete. As shown in blocks 630 and 636, build instructions "S" may be output as build instructions associated with Target.exe.

Figure 7:
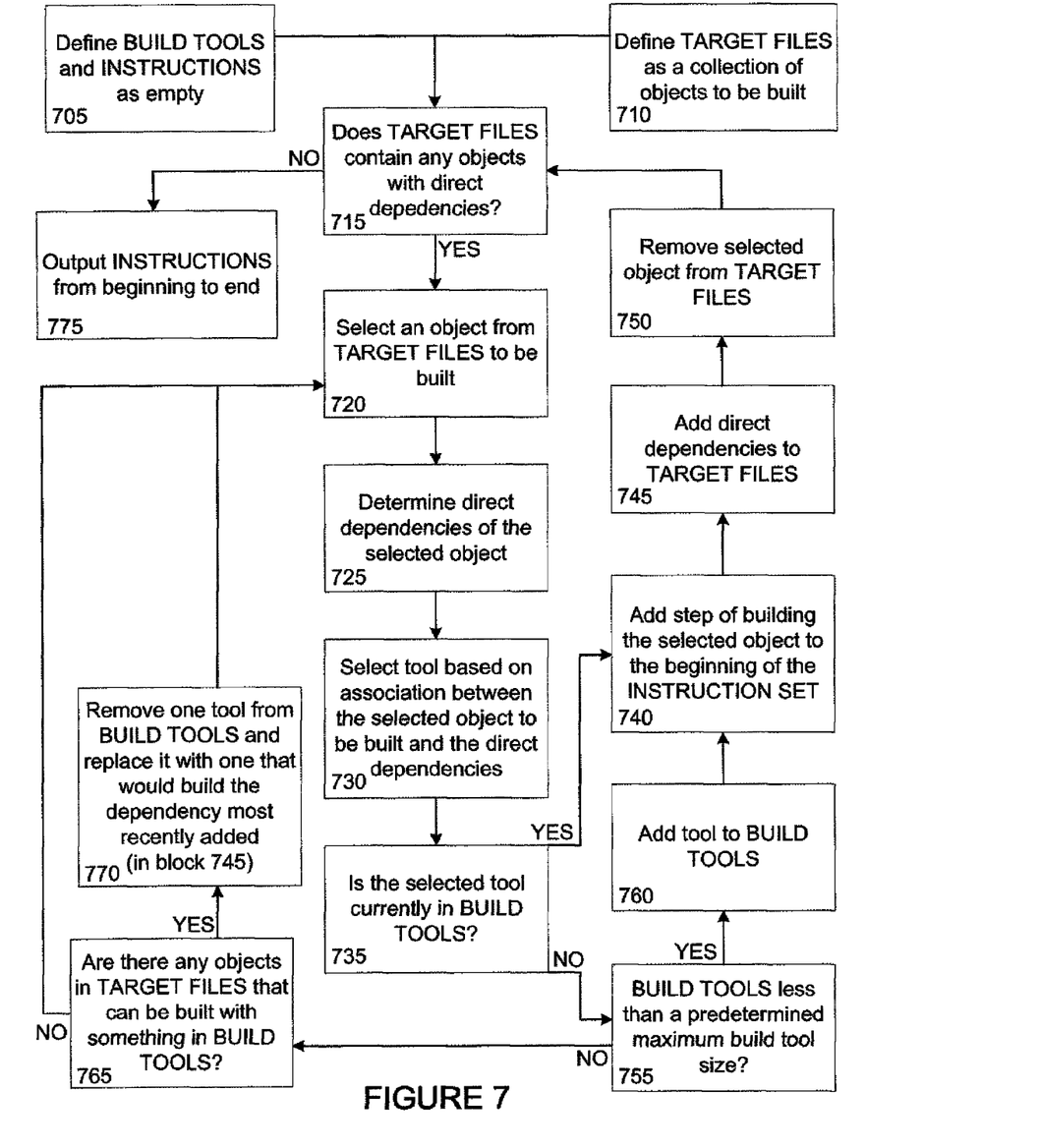
FIG. 7 is a flow chart in accordance with an aspect of the invention.

As shown in FIG. 7, a process may identify an objects to be built and output corresponding instructions. As shown in blocks 705 and 710, sets BUILD TOOLS and INSTRUCTIONS may be undefined while set TARGET FILES may be defined as a collections of objections to be built. At block 715, the process determines whether TARGET FILES includes contains any objects with direct dependencies. If TARGET FILES contains objects to be built, as shown in block 720 an object of TARGET FILES may be selected to be built. Then at block 725, the direct dependencies of the selected object may be determined. As shown in block 730, a tool may be selected based on the associated between the selected object and the direct dependencies.

As shown in blocks 735 and 740, if the selected tool is currently in BUILD TOOLS, the step of building the selected objected may be added to the beginning of INSTRUCTIONS. Then at block 745, the direct dependencies of the selected object may be added to TARGET FILES. The selected object may be removed from the TARGET FILES as shown in block 750. The process returns at block 720.

As shown in blocks 735 and 755, if the selected tool not currently in BUILD TOOLS and BUILD TOOLS is less than a predetermined maximum build tool size, the selected tool may be added to BUILD TOOLS at block 760. Next, as shown in block 740, the step of building the selected object may be added to the beginning of INSTRUCTIONS. Then at block 745, the direct dependencies of the selected object may be added to TARGET FILES. The selected object may be removed from the TARGET FILES as shown in block 750. The process returns to block 720.

As shown in blocks 735 and 755, if the selected tool not currently in BUILD TOOLS and BUILD TOOLS is greater than or equal to a predetermined maximum build tool size, whether there are any objects in TARGET FILES that can be built with something in BUILD TOOLS is determined as shown in block 765. If there is an object in TARGET FILES that can be built with something in BUILD TOOLS, the process returns to block 720. If there is no object in TARGET FILES that can be built with something in BUILD TOOLS, a tool may be removed from BUILD TOOLS and replaced with a tool that can be used to build the most recently added dependency as shown in block 770.

Returning to block 715, if there are no more objects in TARGET FILES with direct dependencies, INSTRUCTIONS are output from beginning to end.

One of the advantages of the invention is its ability to accommodate a wide variety of alternatives and additions to the foregoing features.

In one alternative, build tool "C" may define a set of build tools. For example, for computers with greater cache memory, build tool "C" may be set to [compiler; assembler] based on the associations between the dependencies and the target file. In that regard, build tool "C" may hold multiple values at any given time.

As these and other variations and combinations of the features discussed above can be utilized without departing from the invention as defined by the claims, the foregoing description should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method executed by a processor comprising:
   accessing a plurality of tools;
   accessing a plurality of dependencies, wherein each dependency of the plurality of dependencies is associated with at least one input file, a tool of the plurality of tools, and a target file, wherein the tool of the plurality of tools requires the at least one input file to output the target file;
   identifying a first target file and a first dependency of the plurality of dependencies associated with the first target file;
   determining a first tool based on the first dependency;
   determining other dependencies of the plurality of dependencies associated with the first target file;
   generating an ordered list of the first dependency and the other dependencies, wherein any of the dependencies associated the first tool are listed before other ones of the dependencies that identify a different tool than the first tool;
   identifying at least one input file input file associated with the first dependency and at least one input file associated with the other dependencies; and
   generating instructions identifying an order in which the first tool and the different tool will be executed by the processor and the at least one input file associated with the first dependency and the at least one input file associated with the other dependencies, the order of instructions being based on the ordered list of the first dependency and the other dependencies.

2. The method of claim 1, wherein a more recently added dependency is listed in the ordered list before other ones of the dependencies.

3. The method of claim 1, wherein the generated instructions identify the first tool as a final tool to be executed by the processor.

4. The method of claim 1, wherein determining other dependencies associated with the first target file further comprises:
   identifying a second input associated with the first dependency;
   selecting the second input file associated with the first dependency if the second input file is more recently added than the input file associated with the first dependency;
   selecting a second target file based on the selected second input file; and
   determining a second dependency associated with a second tool and the selected second target file.

5. The method of claim 4, wherein the second tool is different from the first tool.

6. The method of claim 4, further comprising generating the first target file and the second target file based on the generated instructions.

7. The method of claim 1, further comprising generating the first target file by causing a processor to operate tools on the first dependency and the at least one input file associated with the other dependencies in the order identified in the generated instructions.

8. The method claim 1, wherein the first target file is executable machine code.

9. A system comprising:
   a processor;
   instructions operable by the processor; and
   a display displaying data processed by the processor in accordance with the instructions, the instructions causing the processor to:
   access a plurality of tools;
   access a plurality of dependencies, wherein each dependency of the plurality of dependencies is associated with at least one input file, a tool of the plurality of tools, and a target file, wherein the tool of the plurality of tools requires the at least one input file to output the target file;
   identify a first target file and a first dependency of the plurality of dependencies associated with the first target file;
   determine a first tool based on the first dependency;
   determine other dependencies of the plurality of dependencies associated with the first target file;
   generate an ordered list of the first dependency and the other dependencies, wherein any of the dependencies associated the first tool are listed before other ones of the dependencies that identify a different tool than the first tool;
   identify at least one input file input file associated with the first dependency and at least one input file associated with the other dependencies; and
   generate build instructions identifying an order in which the first tool and the different tool will be executed by a processor and the at least one input file associated with the first dependency and the at least one input file associated with the other dependencies, the order of instructions being based on the ordered list of the first dependency and the other dependencies.

10. The system of claim 9, wherein a more recently added dependency is listed in the ordered list before other ones of the dependencies.

11. The system of claim 9, wherein the generated instructions identify the first tool as a final tool to be executed by the processor.

12. The system claim 9, wherein the first target file is executable machine code.

13. The system of claim 9, wherein the determining other dependencies associated with the first target file further cause the processor to:
- identify a plurality of input files associated with the first dependency in a particular order which indicates a most recently added input file;
- select a second target file based on the most recently added input file; and
- determine a second dependency associated with a second tool and the selected second target file.

14. The system of claim 13, wherein the second tool is different from the first tool.

15. The system of claim 9, wherein the instructions further cause the processor to generate the first target file by operating tools on input files to a set of tools in the order identified in the build instructions.

16. The system of claim 13, wherein the build instructions further cause the processor to generate the first target file and the second target file based on the generated instructions.

17. A method executed by a processor comprising:
- accessing a plurality of tools;
- accessing a plurality of dependencies, wherein each dependency of the plurality of dependencies is associated with at least one input file, a tool of the plurality of tools, and a target file, wherein the tool of the plurality of tools requires the at least one input file to output the target file;
- identifying a first target file and a first dependency of the plurality of dependencies associated with the first target file;
- determining a first set of tools based on the first dependency;
- determining other dependencies of the plurality of dependencies associated with the first target file;
- generating an ordered list of the first dependency and the other dependencies, wherein any of the dependencies associated the first set of tools are listed before other ones of the dependencies that identify a different set of tools than the first set of tools;
- identifying at least one input file input file associated with the first dependency and at least one input file associated with the other dependencies; and
- generating instructions identifying an order in which the first set of tools and the different set of tools will be executed by the processor and the at least one input file associated with the first dependency and the at least one input file associated with the other dependencies, the order of instructions being based on the ordered list of the first dependency and the other dependencies.

18. The method of claim 17, wherein a more recently added dependency is listed in the ordered list before other dependencies.

19. The method of claim 17, wherein the instructions further comprise generating the target file by executing a processor to operate the first set of tools on the at least one input file associated with the first dependency and the different set of tools on the at least one input file associated with the other dependencies in the order identified in the generated instructions.

* * * * *